(12) United States Patent
Savir et al.

(10) Patent No.: US 11,514,059 B2
(45) Date of Patent: Nov. 29, 2022

(54) INTELLIGENT CONTACT SEARCH USING GRAPH MODELS

(71) Applicant: EMC IP Holding Company LLC, Hopkinton, MA (US)

(72) Inventors: Amihai Savir, Sansana (IL); Avitan Gefen, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 410 days.

(21) Appl. No.: 16/524,778

(22) Filed: Jul. 29, 2019

(65) Prior Publication Data

US 2021/0034630 A1   Feb. 4, 2021

(51) Int. Cl.
| | |
|---|---|
| *G06F 16/00* | (2019.01) |
| *G06F 16/2457* | (2019.01) |
| *G06F 16/29* | (2019.01) |
| *G06Q 10/06* | (2012.01) |
| *G06F 9/54* | (2006.01) |
| *G06F 21/44* | (2013.01) |
| *G06F 16/9537* | (2019.01) |

(52) U.S. Cl.
CPC .......... *G06F 16/24578* (2019.01); *G06F 9/54* (2013.01); *G06F 16/29* (2019.01); *G06F 16/9537* (2019.01); *G06F 21/44* (2013.01); *G06Q 10/0637* (2013.01)

(58) Field of Classification Search
CPC ............... G06F 16/24578; G06F 16/29; G06F 16/9024; G06F 16/9537; G06F 21/44; G06F 9/54; G06Q 10/0637
See application file for complete search history.

(56) References Cited

U.S. PATENT DOCUMENTS

| | | | | |
|---|---|---|---|---|
| 2006/0026298 A1* | 2/2006 | Zeng | ............... | G06Q 10/107 709/240 |
| 2009/0030709 A1* | 1/2009 | Arbajian | ............... | G06Q 10/101 705/300 |
| 2012/0290565 A1* | 11/2012 | Wana | ............... | G06F 16/958 707/723 |
| 2015/0227530 A1* | 8/2015 | Liu | ............... | G06F 16/337 707/734 |
| 2015/0234832 A1* | 8/2015 | Gardner, III | ............... | G06Q 50/01 707/749 |
| 2017/0155615 A1* | 6/2017 | Ji | ............... | H04L 51/32 |
| 2017/0310625 A1* | 10/2017 | Hu | ............... | H04L 51/26 |
| 2018/0198884 A1* | 7/2018 | Debald | ............... | G06Q 10/10 |

* cited by examiner

*Primary Examiner* — Dinku W Gebresenbet

(74) *Attorney, Agent, or Firm* — Terrile, Cannatti & Chambers, LLP; Emmanuel A. Rivera

(57) ABSTRACT

A system, method, and computer-readable medium are disclosed for improved searching of contact information that includes receiving a request for a member's contact information. An initial list of candidates is returned. Based on organizational charts, distances between candidates and a point of reference are calculated, calculation is made as to a number of messages that are exchanged between candidates and the point of reference. Scores are determined based on the calculations. The scores are aggregated, and a refined list of candidates' contact information based on the aggregated scores is returned.

14 Claims, 6 Drawing Sheets

| SENDER 702 | RECEIVER 704 | TIMESTAMP 706 | SUBJECT 708 |
|---|---|---|---|
| mark.jones@bigbiznez.com | ryan.kendrick@bigbiznez.com | 1/2/18 02:23:45 | meeting |
| ryan.yao@bigbiznez.com | mark.jones@bigbiznez.com | 1/2/18 02:37:33 | conference |
| ryan.stephenson@bigbiznez.com | mark.jones@bigbiznez.com | 1/2/18 06:10:15 | review |
| mark.jones@bigbiznez.com | ryan.yao@bigbiznez.com | 1/2/18 07:15:12 | budget |
| ryan.yao@bigbiznez.com | mark.jones@bigbiznez.com | 1/2/18 08:45:03 | review |
| mark.jones@bigbiznez.com | ryan.nichols@bigbiznez.com | 1/2/18 09:20:42 | conference |
| mark.jones@bigbiznez.com | ryan.lowe@bigbiznez.com | 1/2/18 09:23:19 | budget |
| ryan.lowe@bigbiznez.com | mark.jones@bigbiznez.com | 1/2/18 10:11:12 | conference |
| ryan.nichols@bigbiznez.com | mark.jones@bigbiznez.com | 1/2/18 11:06:51 | lunch |
| mark.jones@bigbiznez.com | ryan.lowe@bigbiznez.com | 1/2/18 14:42:45 | meeting |
| mark.jones@bigbiznez.com | ryan.peterson@bigbiznez.com | 1/2/18 15:44:45 | meeting |
| ryan.lowe@bigbiznez.com | mark.jones@bigbiznez.com | 1/2/18 16:21:15 | budget |

*Figure 7*

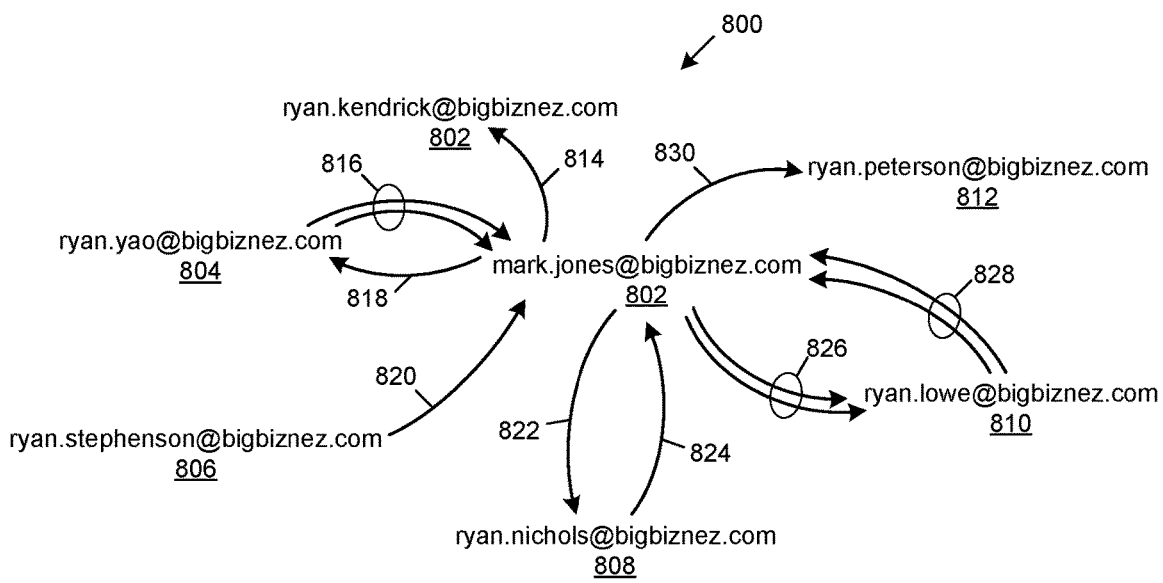

*Figure 8*

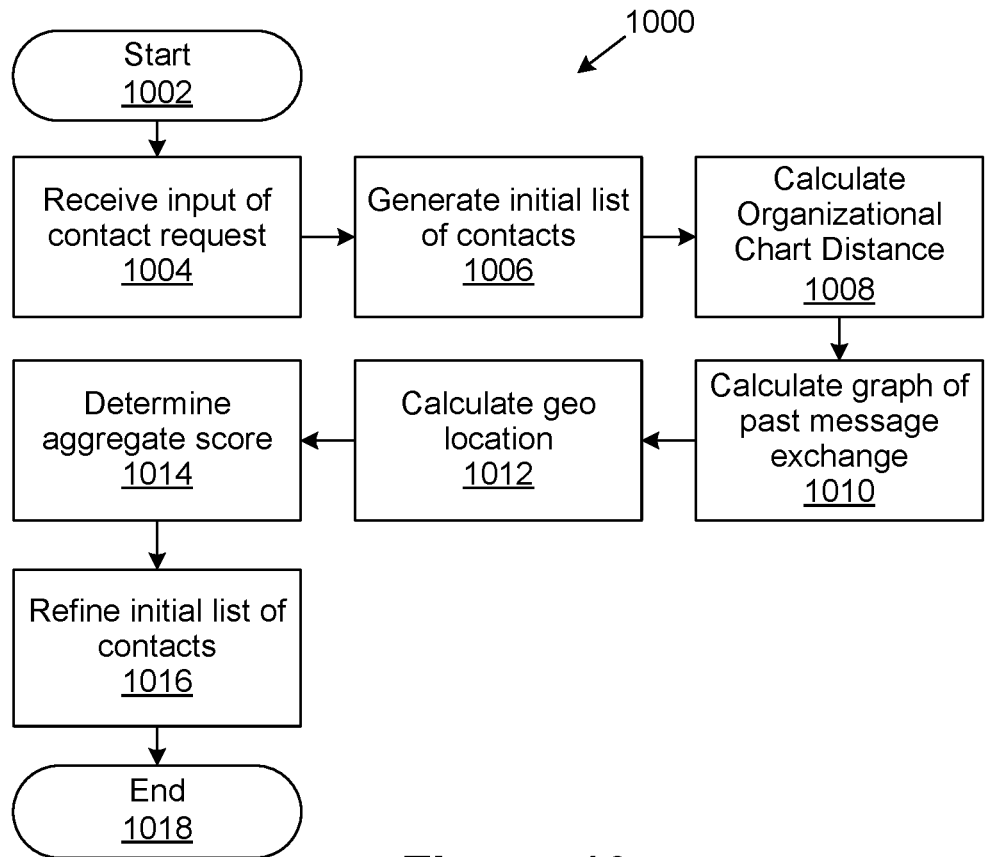

US 11,514,059 B2

INTELLIGENT CONTACT SEARCH USING GRAPH MODELS

BACKGROUND OF THE INVENTION

Field of the Invention

The present invention relates to the management of information handling systems. More specifically, embodiments of the invention provide a system, method, and computer-readable medium for improved searching of contact information.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Organizations rely on communication infrastructures that include telephones, video conference, email, etc. Organizations are made of members/people who are assigned particular contact information, such as phone numbers, video conference identifiers, email addresses, etc. In certain instances, a specific individual is to be contacted. For example, someone wants to send an email message to another person. Therefore, the correct email address of the individual is needed. Finding the correct email address can be a problem.

For relatively smaller organizations, there are fewer members. Finding a particular person may not be too difficult. With larger organizations with many members, finding the correct contact information, such as an email address, can be a challenge. For example, typical email address searches can involve searching a first name, and sometimes both first and last names. For large organizations, there can be members with the same first names, same last names, or both same first and last names. Furthermore, the spelling of the first and/or last name may be incorrect in the search. In certain instances, a person may go by a nick name or different name. For example, "Michael" may go by "Mike." The search may be for "Michael", however, the person may spell his name "Mikel." Sometimes, a search may be performed for a phonetically similar name, for example, a search for "Kathy" may be actually for a "Cathy."

Other contact searching can involve searching an organizational chart(s). This can be a tedious manual process. In certain cases, there may be incomplete information, such as when an individual is not listed on an organizational chart. In certain instances, an organizational chart may not have contact information of the member.

Typical contact search techniques cannot only be inaccurate and frustrating, such techniques can lead to compromising data security. For example, if the wrong email message is sent to the wrong member, it may not only be embarrassing to the sender, it can lead to leaking sensitive data to the wrong person. In certain instances, sending an email message to the wrong individual can be inconvenient and lead to productivity loss. For example, if a meeting request is sent to the wrong email address, the organizer may be relying on a key person to attend; however, that key person may never have received the request, since the email request was sent to the wrong address.

SUMMARY OF THE INVENTION

A system, method, and computer-readable medium are disclosed for improved searching of contact information that includes receiving a request for a member's contact information. An initial list of candidates is returned. Based on organizational charts distances between candidates and a point of reference are calculated, calculation is made as to a number of messages that are exchanged between candidates and the point of reference. Scores are determined based on the calculations. The scores are aggregated, and a refined list of candidates contact information based on the aggregated scores is returned.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 is a simplified block diagram of an email message exchanges;

FIG. 8 is a simplified graph of representing email message exchanges;

FIG. 9 is a simplified graph of distance relationships between members; and

FIG. 10 is a general flowchart for searching of contact information.

DETAILED DESCRIPTION

A system, method, and computer-readable medium are disclosed for improved searching of contact information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
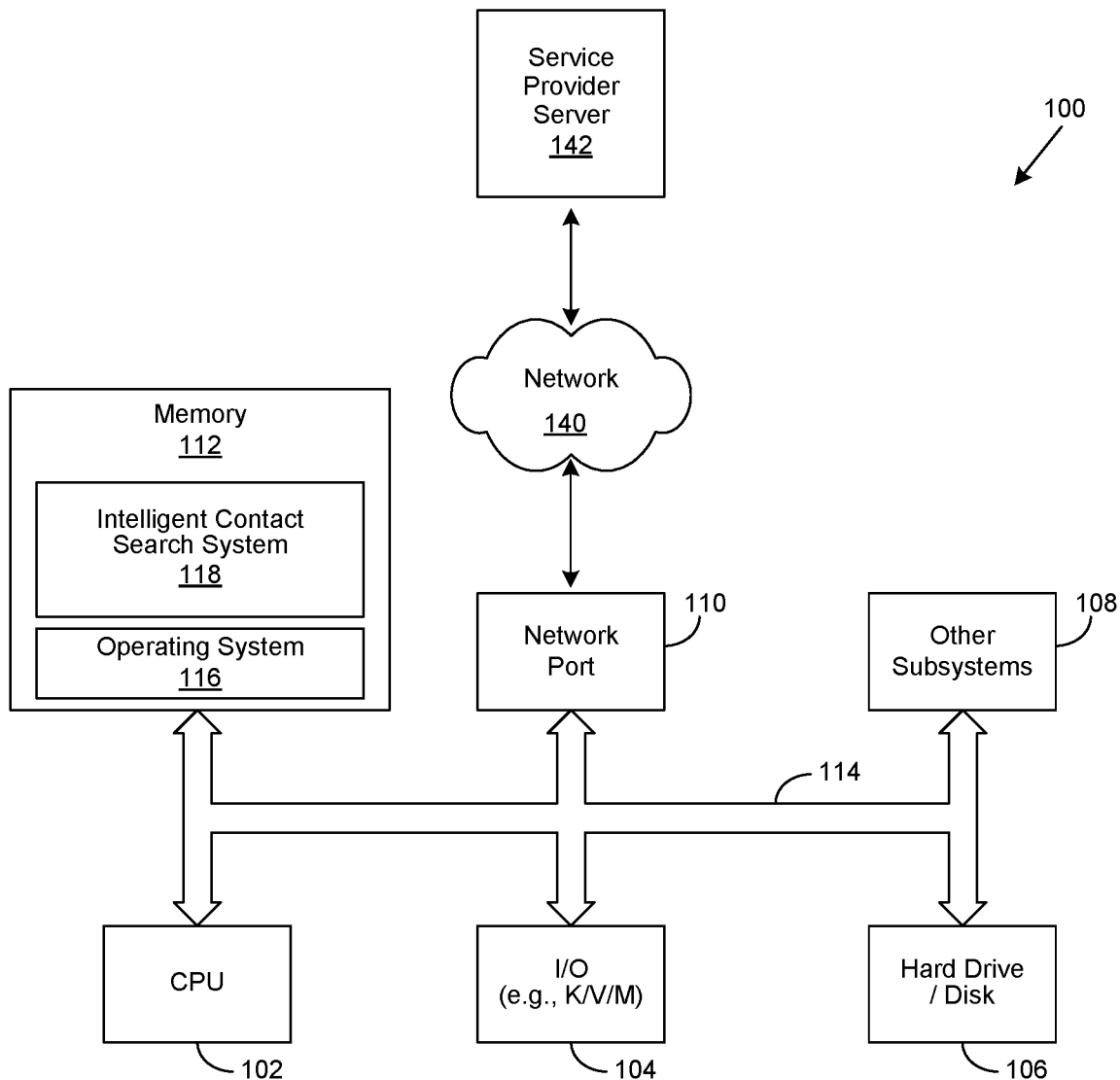
FIG. 1 is a general illustration of components of an information handling system.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include an intelligent contact search system 118. In certain implementations, the intelligent contact search system 118 is provided as a service from the service provider server 142.

In certain embodiments, the intelligent contact search system 118 provides for finding contact information, such as an email address for a member in an organization. In certain implementations, the intelligent contact search system 118 is configured to determine contact information based on a determined list of possible contacts and provide to a user an ordered recommended list of contact information, such as email addresses.

Figure 2:
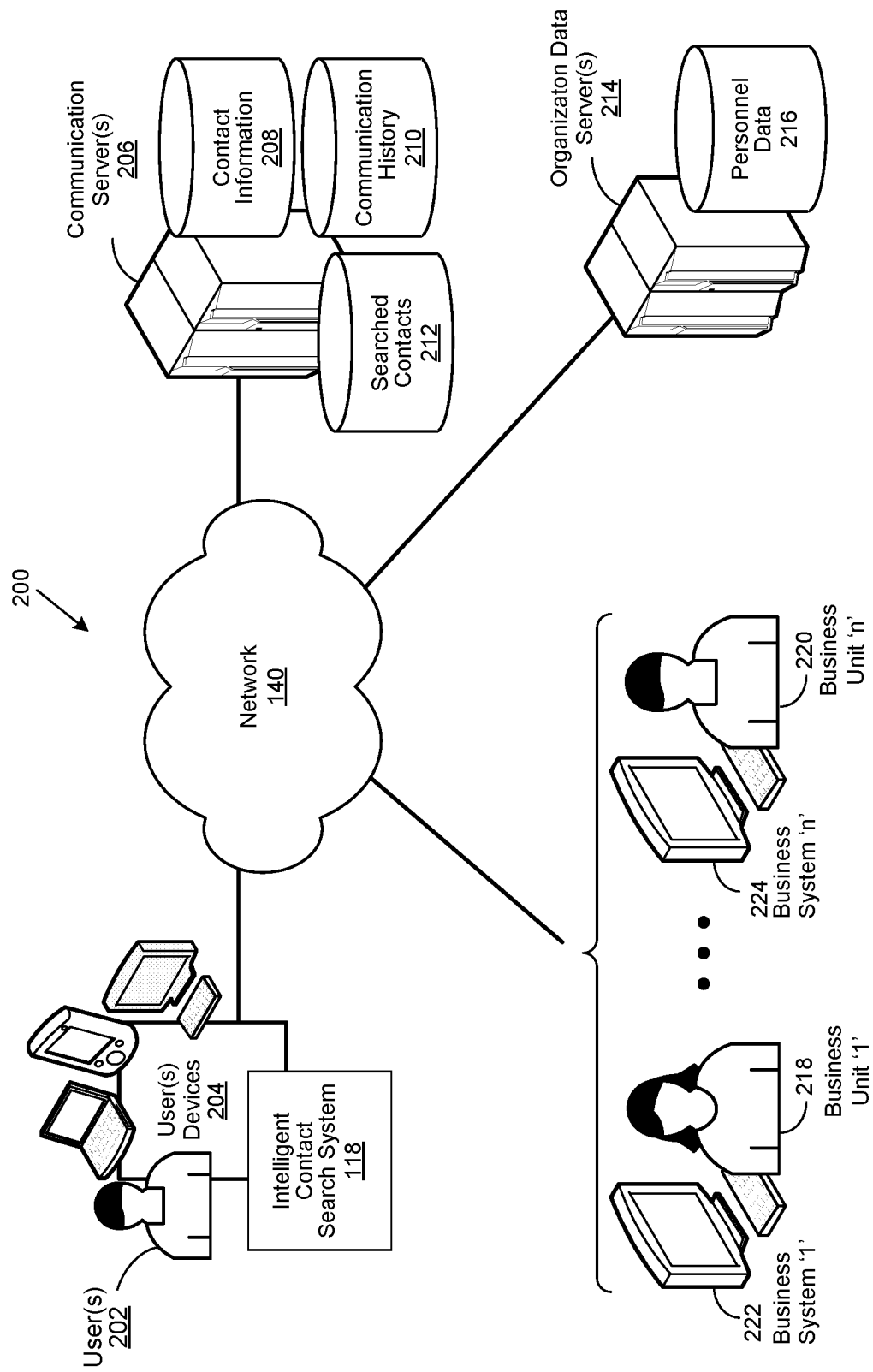
FIG. 2 is a simplified block diagram of organizational information and communication technology (ICT) system.

FIG. 2 is a simplified block diagram of an organizational information and communication technology (ICT) system that implements intelligent contact search system 118 in accordance with an embodiment of the invention to provide contact information of members. In certain implementations, the ICT system 200 supports an organization, and particularly communication for the organization. Communication includes teleconference, video conference, email communications, etc.

The organization includes multiple members/personnel as represented by user(s) 202. User(s) 202 communicate with another, and in certain implementations communicate with entities (i.e., persons) that are outside of the organization supported by ICT system 200. User(s) 202 can be representative of multiple users, and user device(s) 204 are representative of multiple devices or information handling systems. In certain implementations, as used herein, user device(s) 204 refers to an information handling system 100. User device(s) 204 can include a personal computer, a laptop computer, a tablet computer, a personal digital assistant (PDA), a smart phone, a mobile telephone, or other device that is capable of communicating and processing data. In certain implementations, user device(s) 204 represents a user environment that includes various computing devices (e.g., servers), storage, software solutions, hardware (e.g., accessories), etc.

In various embodiments, the user device(s) 204 is used to exchange information through the use of network 140. In certain embodiments, the network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

In certain implementations, user device(s) 204 are connected to communication server(s) 206. Communication server(s) 206 can provide communication services, such as email between user device(s) 204. Furthermore, as further described below, communication server(s) 206 can implemented to provide information to the intelligent contact search system 118. In certain implementations, the communication server(s) 206 is connected to a contact information storage or database 208. The contact information database 208 can store the individual contact information of members or persons in an organization.

Figure 3:
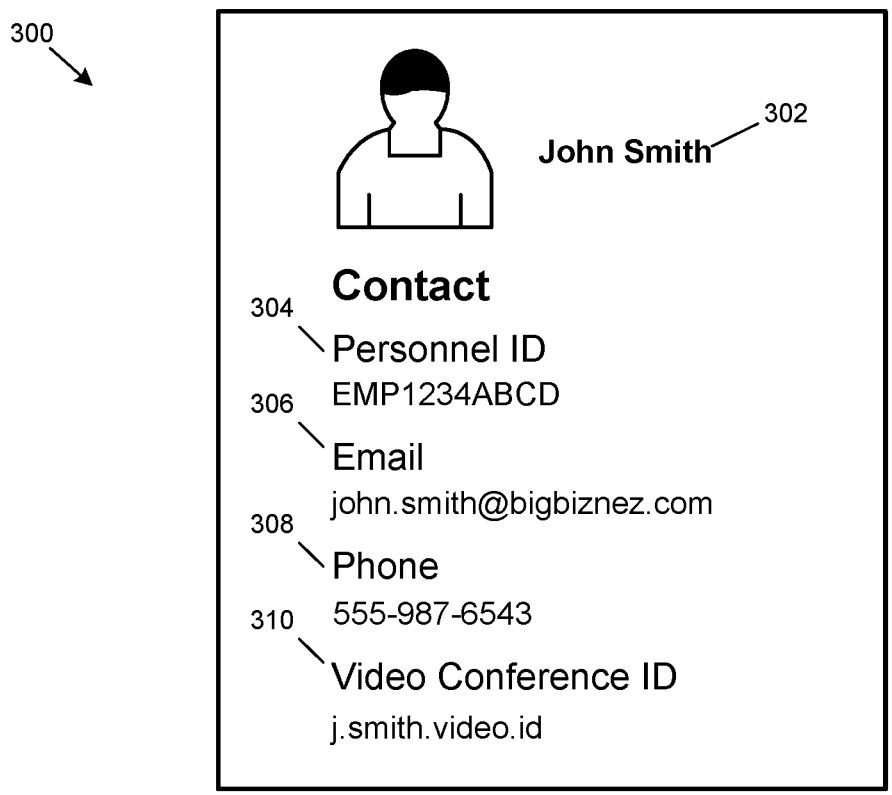
FIG. 3 is a simplified block diagram contact information of a member of an organization.

Referring now to FIG. 3, an example of a member contact information 300 is shown. The member contact information 300 can include a member's name 302. In this example, the name is "John Smith." An organization can have members with the same name. Therefore, there may be more than one "John Smith" in the organization. Members in the organization will have identifiers that are unique to them. The contact information 300 can include such unique identifiers. In this example, the unique identifiers are "Personnel ID" 304, "email address" 306, "phone number" 308, and "video conference ID" 310. The unique identifiers can be used to differentiate between members with the same/similar names.

Now referring back to FIG. 2, in certain implementations, the communication server(s) 206 can be connected to a communication history storage or database 210. The communication history database 210 can include a history of various communication logs, such as email exchanges between user(s) 202. In order to secure sensitive communication logs, searching for particular email exchanges can be performed at protected communication server(s) 206. In certain implementations, user(s) 202 will perform searches, such as a search for a particular name. The results of such searches can be stored in a searched contacts storage or database 212. Instead of performing a new search for a particular name, previous search results can be retrieved from the search contacts database 212

In certain embodiments, the ICT system 200 includes an organizational data server(s) 212. The organizational data server(s) 212 can be connected to network 140 and support user(s) 202 and user device(s) 204. In certain implementations, the organizational data server(s) 214 can be connected to a personnel data storage or database 214. The personnel data database 216 can include information, such as updated organizational charts.

It is to be understood that the described devices, such as servers and databases can be resident in various locations, be implemented as part of cloud computing, combined, and configured in various implementations. Furthermore, the described processes are not limited to the described configurations.

In certain implementations, the user(s) 202 can interact with one or more business units, as represented by business unit '1'" 218 through business unit 'n' 220. Communication by business unit 1" 218 through business unit 'n' 220 can be through network 140 through respective business system '1' 222 through business system 'n' 224.

In certain implementations, the business unit 1" 218 through business unit 'n' 220 can include product support or customer support units, such as information technology (IT) administrators, human resources administrators, etc. that assist user(s) 202. For example, a product support unit can provide software application updates, documentations, links for help, etc. to user(s) 200. In certain implementations, the product support unit or IT group can track or monitor software applications, update databases, such as databases 208, 210 and 216. For example, human resource administrators can update member contact information in contact information database 208 and organizational charts in personnel database 216. Business unit 1" 218 through business unit 'n' 220 can include marketing, product development, sales, etc. which can be any business unit/entity that has a relationship or interest with user(s) 202 and user device(s) 204.

Figure 4:
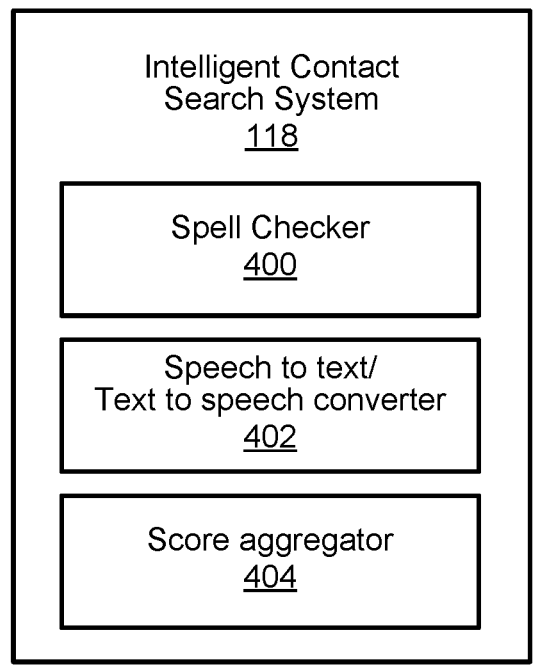
FIG. 4 is a simplified block diagram of an intelligent contact search system.

Referring to FIG. 4, a block diagram of intelligent contact search system 118 is shown. In certain implementations, the intelligent contact search system 118 includes a spell checker 400. When a user (i.e., user 202) types/enters a name for searching, spell checker 400 can be configured to find common spelling mistakes and to edit distance between letters of a name. In certain implementations, the spell checker 400 scans the name that was entered/typed and extracts the first name and last name (if the last name is entered). A comparison can be performed with a list of correctly spelled names in the organization. For certain implementations, the list can be from contact information database 206 and/or personnel data database 216. Such a list can include only words, and in certain instances the list can include additional information, such as hyphenation points or lexical and grammatical attributes. The spell checker 400 can also consider different forms of the same or similar name, such as verbal forms and regional forms of a name. For example, "Mark" can be the same as "Marc"; "Aleks" the same as "Alex"; "Yevgeni" the same as "Evgeni"; "Alexander" the same as "Alex"; "William" the same as "Liam" and "Guillermo"; "Stephen" with "Steven"; "Cathy" with "Kathy", etc. Therefore, the search can be performed on contacts with "similar" names and not just with exact names entered by a user.

In certain implementations, the intelligent contact search system 118 includes a speech to text/text to speech converter 402. In certain implementations, speech to text/text to speech converter 402 converts names that are entered/typed to phonetic data, and a search can be performed based on the phonetic data on similarly sounding names. For example, results based on "Steven" can include "Stephen." The search results can be returned as text. In certain implementations, the intelligent contact search system 118 includes a score aggregator 404, which is further described below.

Figure 5:
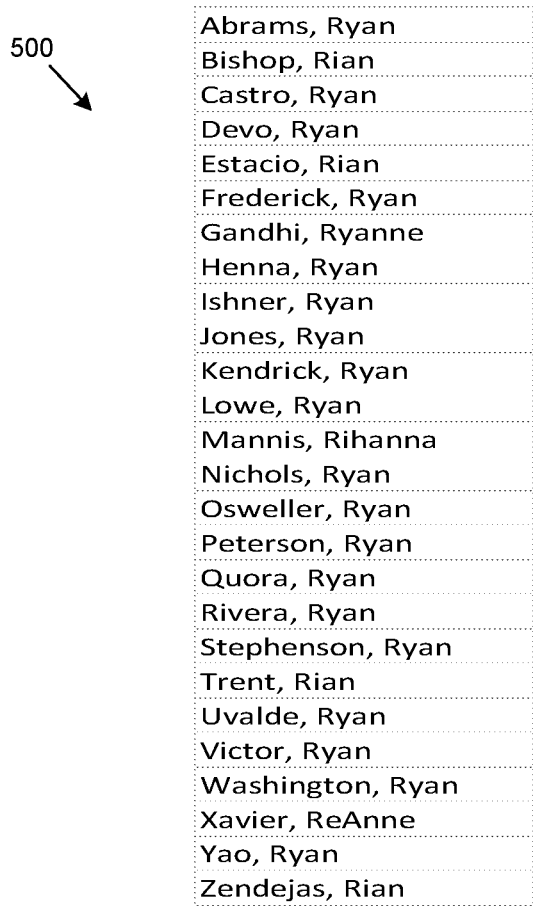
FIG. 5 is a list of possible search contacts.

FIG. 5 is an example list of possible search contacts. When intelligent contact search system 118 performs a search on a name as described above, a preliminary list of contacts 500 is created. In certain implementations, the list of contacts 500 includes all contacts found in contact information database 208. In this example, the name that is searched is "Ryan." All contacts with the name "Ryan" or similar (e.g., phonetically similar) are returned. In the example, list of contacts 500 is the result. For certain implementations, the list of contacts 500 is further processed as described below.

To further process and narrow the list of contacts 500, in certain implementations, the intelligent contact search system 118 looks to organizational charts. An organizational chart is basically a tree that represents the organization's employees and the hierarchy. As discussed above, organizational charts can be in personnel data database 216 described in FIG. 2.

Figure 6:
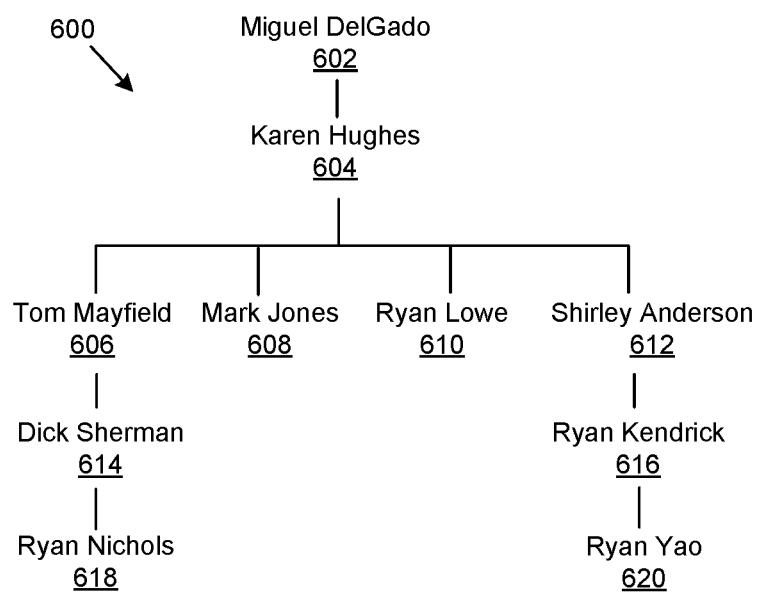
FIG. 6 is a simplified block diagram of an organizational chart.

FIG. 6 is an example of an organizational chart. The organizational chart 600 includes various members of an organization. Organizational chart 600 can be considered as a graph. In certain implementations, an organizational chart can include more or all members of the organization. Organizational chart is illustrated as an example of narrowing or further processing the list of contacts 500. Organizational chart 600 includes a top down hierarchy of certain members from 602 to 620. Two people may be working very close together, although they may be reporting to different management/people. For example, Marc Jones 608 reports to Karen Hughes 604. Ryan Nichols 618 reports directly to Dick Sherman 614. Mark Jones 608 may invite Ryan Nichols 618 to a meeting, since they work close together. When the meeting invite is sent, it may be Mark Jones 608 may assume that he is referring to Ryan Nichols 618 when he is referring to a "Ryan."

In processing and refining the list of contacts 500 to a more accurate list, a calculation may be performed as to distance between a common point of reference in an organizational chart and using distances between that common point of reference and nodes representing members in the list of contracts. For example, Marc Jones 608 can be the common point of reference. A distance algorithm can be calculated for the organizational chart 600 based on lowest common ancestor or LCA as used for a "n-nary" tree.

To calculate LCA, starting with a root node, in this example Marc Jones 608, given nodes, or "Ryan" nodes are searched, where the given nodes are at (u, v). There can be two cases, when a node is determined to be an LCA. The first case is when the node is equal to u or v, and the other node falls in the subtree of its children. The second case is when both nodes fall in different subtrees of its children. If they fall in the same subtree of its child, then this node may not be the LCA. Starting from the root node, and recurring in preorder, u and v are searched. If any node of u and v are returned then a "true" is returned, indicating an LCA. When a recur for children of any node takes place, a counter is taken as to how many children are given as a true result, since if exactly two of its children return true, this can mean that the current node is the LCA (see second case) and if one of its children return true and it is itself one of the nodes whose LCA is to be found then this node is the LCA (see first case). Since LCA is set in post order, it is set only once. As recurring takes place in preorder, visiting every node, the time complexity of this approach can be considered as O(n).

A score can be determined as to the which "Ryan" is closest to Marc Jones 608. In this example, Ryan Lowe 610 is closest and receives a relatively higher score, since Ryan Lowe 610 is one edge close to Mark Jones 608. Ryan Nichols 618 and Ryan Kendrick 616 are three edges removed from Mark Jones 608. Ryan Yao 620 is four edges removed from Mark Jones 608. Therefore, based only on an organizational chart scoring or organizational chart distance the contact list 500 can be reordered or "scored" as 1) Ryan Lowe, 2) Ryan Nichols, 3) Ryan Kendrick and 4) Ryan Yao.

In certain implementations, the contact list 500 can be further refined based on email message exchanges and a graph based on the email message exchanges. A record is determined of email message exchanges between particular members. The record can be based on email message exchanges between a specific member and members of the contact list 500. In certain implementations, the record can be taken periodically.

FIG. 7 is an example of a list of email exchanges. Email message exchange list 700 can include various headers. For example, email exchange list 700 includes the following headers: sender 702, receiver 704, timestamp 706, and subject 708. Sender 702 and receiver 704 are specially used in further refining the contact list 500. Other headers can be part of an email message information. In the example shown of email message exchange list 700, Mark Jones, identified as Mark Jones 608 of FIG. 6, has an email address of "mark.jones@bigbiznez.com." The email message exchange list 700 shows email messages exchanges between "mark.jones@bigbiznez.com" and different "Ryans." Each email message is listed as a record, where either "mark.jones@bigbiznez.com" is a sender or a receiver with a "Ryan." Each record has a timestamp. As discussed above, the email message exchange list 700 can be taken periodically or over a certain time period.

FIG. 8 is an example of a graph representing email message exchanges. Graph 800 represents the number of email message exchanges between "mark.jones@bigbiznez.com" 802 and "Ryans" in the email message exchange list 700 of FIG. 7. Graph 800 is a graphical representation email message exchanges, where each edge represents an email message. In this example, "mark.jones@bigbiznez.com" 802 as either sender or receiver has email message exchanges with "ryan.kendrick@bigbiznez.com" 802, "ryan.yao@bigbiznez.com" 804, "ryan.stephenson@bigbiznez.com" 806, "ryan.nichols@bigbiznez.com" 808, "ryan.lowe@bigbiznez.com" 810, and "ryan.peterson@bigbiznez.com" 812.

Instances of email messages are indicated by edges between email addresses shown by directional arrows, where the arrows point as to delivery (i.e., sender to receiver) of the email. Each arrow represents a single email message. In this example, email addresses representing persons show the following. Mark Jones sent one email message to Ryan Kendrick as represented by edge/arrow 814. A total of one email message between Mark Jones and Ryan Kendrick. Mark Jones received two emails messages from Ryan Yao as represented by edges/arrows 816 and sent one email message to Ryan Yao as represented by edge/arrow 818. A total of three email messages between Mark Jones and Ryan Yao. Mark Jones received one email message from Ryan Stephenson as represented by edge/arrow 820. A total of one email message between Mark Jones and Ryan Stephenson. Mark Jones sent one email message to Ryan Nichols as represented by edge/arrow 822 and received one email message from Ryan Nichols as represented by edge/arrow 824. A total of two email messages between Mark Jones and Ryan Nichols. Mark Jones sent two email messages to Ryan Lowe as represented by edges/arrow 826 and received two email messages from Ryan Nichols as represented by edges/arrows 828. A total of four email messages between Mark Jones and Ryan Nichols. Mark Jones sent one email message to Ryan Peterson as represented by edge/arrow 830. A total of one email message between Mark Jones and Ryan Peterson.

Based on the graph 800, and the count of the number of email messages, the following ranking is created: Ryan Lowe—4 email messages, Ryan Yao—3 email messages, Ryan Nichols—2 email messages, Ryan Kendrick—1 email message, Ryan Stephenson—1 email message, and Ryan Peterson—1 email message. A ranking of "scores" can be 1) Ryan Lowe, 2) Ryan Yao, 3) Ryan Nichols, 4) Ryan Kendrick, 5) Ryan Stephenson and 6) Ryan Peterson. Referring back to the scored ranking from the organization chart distance as discussed above in reference to FIG. 6, which is follows, 1) Ryan Lowe, 2) Ryan Nichols, 3) Ryan Kendrick and 4) Ryan Yao.

In certain implementations, the two ranked or scored lists can be combined/averaged to provide a new refined list of possible contacts. If the two ranked or scored lists are equally weighted, then the revised list can be as follows: 1) Ryan Lowe, 2) Ryan Nichols, 3) Ryan Yao, 4) Ryan Kendrick, 5) Ryan Stephenson, and 6) Ryan Peterson.

FIG. 9 shows examples of geographical locations of candidates. The initial list of contacts 500 as described in FIG. 5 can be defined by geographical location. An assumption can be made that candidates that are in the same location are more likely to have contact with one another than with candidates in other locations. Geographical locations 900 show three different geographical locations: Texas 902, California 904, and Israel 906, which include specific candidates (i.e., "Ryans"). In certain implementations, consideration can be given as to geographical co-location of candidates with the reference member, which is "Mark Jones." In this example, "Mark Jones", "Ryan Lowe", and "Ryan Stephenson" work in California 904. An additional score can be given to "Ryan Lowe" and "Ryan Stephenson." The revised list can be 1) Ryan Lowe, 2) Ryan Nichols, 3) Ryan Yao, 4) Ryan Stephenson, 5) Ryan Kendrick, and 6) Ryan Peterson. "Ryan Stephenson" moves up over "Ryan Kendrick."

Referring back to FIG. 4, in certain implementations, the score aggregator 404 can be implemented to perform the combining of scores from the described organizational chart distance, email/contact message exchange graph, and geographical location consideration. In certain implementations, the score aggregator 404 can implement a dynamic weighted score. For example, organizational chart distance can be given a weighted factor of 0.4, email/contact message exchange graph given a weighted factor of 0.5, and geographical location be given a weighted factor of 0.1.

In certain implementations, the weighted factors can be changed. For example, feedback can be implemented as to a user's choice from a list of candidates. The user may consistently choose a candidate from the refined list that is influenced more by one measurement (i.e., organizational chart, email/contact message exchange, geographical location) over the other measurements. That measurement can be given a larger weighted factor over the measurements, such that in future calculations, a more accurate candidate list is provided to the user.

FIG. 10 is a generalized flowchart 1000 as to improved searching of contact information. At block 1002, the process 1000 begins. At block 1002 the process 1000 starts. At step 1004, a request for specific contact information is received. The contact information can be directed to a specific member or entity (person) of an organization. The contact information can include an email address, a telephone number, mailing (mail stop) address, etc. The request can be entered, and a spell check performed. Also, phonetically similarly contacts can be searched. At step 1006, an initial list of contacts is generated. The list of contacts can be from databases of an organizational and can include candidates that are phonetically similar. At step 1008, a calculation is performed on candidates based on organizational chart. In certain implementations, using a member on the organizational chart as a point of reference, relative distances from the point of reference to candidates is measured and a ranking of the list is based on the relative distances. At step 1010, a graph of prior message exchanges is calculated. The graph can be based on email message exchanges, call logs, etc. between the member point of reference and candidates. The message exchanges can be determined over a period of time and taken periodically. The graph can include edges that represent a number of message exchanges between the member point of reference and candidates. At step 1012, candidates and the member point of reference are mapped as to their geographically location. Candidates that are closer or co-located to the member point of reference can be given a higher score. At step 1014, an aggregate score is determined of the candidates based on the calculations and determination. In certain implementations, feedback can be received as to actual choice of a user as to candidates, and the scoring can be adjusted. At step 1016, the initial list of candidates is refined based on the aggregate scores and a list of candidates with contact information is returned. At block 1018, the process ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Python, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for searching of contact information comprising:
    receiving a request for a member's contact information;
    returning an initial list of candidates;
    calculating distance of the candidates to a point of reference on an organizational chart and assigning a score to the candidates based on distance, wherein a distance algorithm is used to determine lowest common ancestor (LCA) of the organizational chart represented as an n-nary tree;
    calculating a number of email message exchanges between the candidates and the point of reference based on geographical location and generating a graph based on the number of email message exchanges and assigning scores to the candidates based on the email message exchanges, wherein the graph includes edges representing a number of message exchanges between the point of reference and candidates;
    aggregating the scores based on the calculating distance and the graph;

refining the initial list of candidates based on the aggregating; and mapping geographical location of the candidates and the point of reference and taking into account geographical location when aggregating scores.

2. The computer-implementable method of claim 1, wherein the returning the list of candidates includes phonetically similar candidates.

3. The computer-implementable method of claim 1, wherein the message exchanges are email messages.

4. The computer-implementable method of claim 1, wherein the messages exchanges are taken over a period of time and taken periodically.

5. The computer-implementable method of claim 1, wherein the aggregating the scores is adjusted based on feedback of choice of a user as to candidates.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for searching of contact information comprising instructions executable by the processor and configured for:
receiving a request for a member's contact information;
returning an initial list of candidates;
calculating distance of the candidates to a point of reference on an organizational chart and assigning a score to the candidates based on distance, wherein a distance algorithm is used to determine lowest common ancestor (LCA) of the organizational chart represented as an n-nary tree;
calculating a number of email message exchanges between the candidates and the point of reference based on geographical location and generating a graph based on the number of email message exchanges and assigning scores to the candidates based on the email message exchanges, wherein the graph includes edges representing a number of message exchanges between the point of reference and candidates;
aggregating the scores based on the calculating distance and the graph;
refining the initial list of candidates based on the aggregating; and
mapping geographical location of the candidates and the point of reference and taking into account geographical location when aggregating scores.

7. The system of claim 6, wherein the returning the list of candidates includes phonetically similar candidates.

8. The system of claim 6, wherein the message exchanges are email messages.

9. The system of claim 6, wherein the messages exchanges are taken over a period of time and taken periodically.

10. The system of claim 6, wherein the aggregating the scores is adjusted based on feedback of choice of a user as to candidates.

11. A non-transitory, computer-readable storage medium embodying computer program code, the computer program code comprising computer executable instructions configured for:
receiving a request for a member's contact information;
returning an initial list of candidates;
calculating distance of the candidates to a point of reference on an organizational chart and assigning a score to the candidates based on distance, wherein a distance algorithm is used to determine lowest common ancestor (LCA) of the organizational chart represented as an n-nary tree;
calculating a number of email message exchanges between the candidates and the point of reference based on geographical location and generating a graph based on the number of email message exchanges and assigning scores to the candidates based on the email message exchanges, wherein the graph includes edges representing a number of message exchanges between the point of reference and candidates;
aggregating the scores based on the calculating distance and the graph;
refining the initial list of candidates based on the aggregating; and
mapping geographical location of the candidates and the point of reference and taking into account geographical location when aggregating scores.

12. The non-transitory, computer-readable storage medium of claim 11, wherein the returning the list of candidates includes phonetically similar candidates.

13. The non-transitory, computer-readable storage medium of claim 11, wherein the messages are email messages.

14. The non-transitory, computer-readable storage medium of claim 11, wherein the aggregating the scores is adjusted based on feedback of choice of a user as to candidates.

* * * * *